US006476158B1

(12) United States Patent
England et al.

(10) Patent No.: US 6,476,158 B1
(45) Date of Patent: Nov. 5, 2002

(54) PROCESS FOR COLORED POLYCARBONATE-POLYESTER COMPOSITIONS WITH IMPROVED WEATHERING

(75) Inventors: William P. England, Evansville; Robert Russell Gallucci, Mt. Vernon, both of IN (US); Paul Joseph Hans, Medina, OH (US); Patricia A. Hubbard, West Sand Lake, NY (US); David Whalen, Mt. Vernon, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/572,299

(22) Filed: May 16, 2000

Related U.S. Application Data

(60) Provisional application No. 60/151,640, filed on Aug. 31, 1999.

(51) Int. Cl.$^7$ ............................ C08L 67/02; C08L 69/00
(52) U.S. Cl. .................. 525/466; 524/87; 524/537; 524/539; 524/601; 524/605; 524/611
(58) Field of Search ................... 524/611, 87, 537, 524/539, 601, 605; 525/466

(56) References Cited

U.S. PATENT DOCUMENTS

| 2,465,319 | A | | 3/1949 | Whinfield et al. | |
|---|---|---|---|---|---|
| 2,999,835 | A | | 9/1961 | Goldberg | |
| 3,038,365 | A | | 6/1962 | Peterson | |
| 3,047,539 | A | | 7/1962 | Pengilly | |
| 3,153,008 | A | | 10/1964 | Fox | |
| 3,215,663 | A | * | 11/1965 | Weisberg | 524/611 |
| 3,334,154 | A | | 8/1967 | Kim | |
| 3,507,951 | A | * | 4/1970 | Morecroft et al. | 524/611 |
| 3,635,895 | A | | 1/1972 | Kramer | |
| 3,808,180 | A | | 4/1974 | Owens | |
| 3,945,979 | A | * | 3/1976 | Kobayashi et al. | 524/611 |
| 3,953,539 | A | | 4/1976 | Kawase et al. | |
| 4,001,184 | A | | 1/1977 | Scott | |
| 4,096,202 | A | | 6/1978 | Farnham et al. | |
| 4,123,436 | A | | 10/1978 | Holub et al. | |
| 4,131,575 | A | | 12/1978 | Adelmann et al. | |
| 4,167,506 | A | * | 9/1979 | Shimata et al. | 524/87 |
| 4,180,494 | A | | 12/1979 | Fromuth et al. | |
| 4,204,047 | A | | 5/1980 | Margotte et al. | |
| 4,257,937 | A | * | 3/1981 | Cohen et al. | 524/611 |
| 4,260,693 | A | | 4/1981 | Liu | |
| 4,260,695 | A | * | 4/1981 | Medem et al. | 524/466 |
| 4,292,233 | A | | 9/1981 | Binsack et al. | |
| 4,460,733 | A | * | 7/1984 | Carter et al. | 524/611 |
| 4,839,405 | A | * | 6/1989 | Speelman et al. | 524/99 |
| 4,965,308 | A | * | 10/1990 | Roovers et al. | 524/421 |
| 5,194,523 | A | * | 3/1993 | Small et al. | 524/611 |
| 5,441,997 | A | | 8/1995 | Walsh et al. | |
| 5,502,153 | A | * | 3/1996 | Sakashita et al. | 524/611 |
| 5,608,027 | A | * | 3/1997 | Crosby et al. | 524/147 |
| 5,672,643 | A | * | 9/1997 | Burns et al. | 524/102 |
| 5,814,712 | A | * | 9/1998 | Gallucci et al. | 525/67 |
| 6,355,723 | B1 | * | 3/2002 | van Baal et al. | 524/602 |

* cited by examiner

*Primary Examiner*—Peter Szekely

(57) ABSTRACT

A process for preparing a high gloss retention resin molding formulation comprising a polyester resin and a polycarbonate resin where the process comprises the steps of selecting a desirable colorant which is stable at molding temperatures and has desirable color retention properties when subjected to weathering, determining an optimized concentration of the colorant for maximizing gloss retention properties of the selected colorant by performing weathering test at differing concentrations of the colorant, and optionally determining a suitable gloss enhancing.

27 Claims, No Drawings

PROCESS FOR COLORED POLYCARBONATE-POLYESTER COMPOSITIONS WITH IMPROVED WEATHERING

This application claims rights of priority form U.S. Provisional Patent Application Ser. No. 60/151,640, filed Aug. 31, 1999.

FIELD OF THE INVENTION

This invention relates to colored polycarbonate-polyester compositions having improved weathering properties and process for their formation.

BACKGROUND OF THE INVENTION

Polyester resins derived from terephthalic acid and reactive derivatives thereof, such as dimethyl terephthalate, and alkanediols have been known for some time and have become important constituents for moldable compositions. Workpieces molded from such polyester resin compositions, alone, or combined with reinforcements, offer a high degree of surface hardness, solvent resistance, abrasion resistance, and high gloss. More recently, blends of such polyester resins with one or more second resins have become of significant commercial interest because such second resins, carefully selected, can greatly improve impact strength, as well as tensile strength, modulus, dimensional stability and distortion temperature under load in parts molded from such compositions. Such second resins can comprise aromatic polycarbonate resins as described for example, in Kawase et al, U.S. Pat. No. 3,953,539 and related polyester-carbonate and polyarylate resins.

Polyester-Polycarbonate blends, like most other plastics, are typically colored with carbon black and titanium dioxide used alone, in combination or with other colorants to produce a range of resins and articles made color. Both titanium dioxide and carbon black are present in such blends as discrete particles. Such typically colored polycarbonate/polyester blends tend to develop haze and surface roughness when subjected to weathering, i.e. either accelerated artificial weathering or natural outdoor weather. This surface roughness shows up as a loss of gloss and/or a color shift. This loss of appearance poses a serious problem for aesthetic applications which require retention of a high gloss appearance.

Hence, it is desirable to obtain improved weathering properties from such colored resins so a high gloss appearance can be retained.

SUMMARY OF THE INVENTION

The present invention provides a process for identification and preparation of high gloss retention resin molding formulations comprising a polyester resin and a polycarbonate, polyarylate or polyester carbonate resin where the process comprises the steps of selecting a desirable colorant which is stable at molding temperatures in the resin mixture and has desirable color retention properties when subjected to weathering, determining an optimized concentration of the colorant for maximizing gloss retention properties of the selected colorant by performing weathering testing at differing concentrations of the colorant, and optionally determining a suitable gloss retention agent for addition to the formulation.

In a preferred embodiment of the present invention molding compositions will comprise (a) from 10 to 90 weight percent of a polyester resin; (c) from 90 to 10 weight percent of an aromatic polycarbonate, polyarylate, polyester carbonate resin or blend thereof and a colorant or colorants in a sufficient amount to give a desirable coloration with the optional addition of a suitable gloss retention agent or impact modifier.

DESCRIPTION OF THE PREFERRED EMBODIMENTS

Synthetic colorants are typically derived from coal tar or petroleum intermediates. Colorants of many distinct types are available for use in plastics and coatings. The Color Index names hundreds of different colorants of many different chemical classes for instance; nitroso, nitro, mono azo, diazo, triazo, polyazo, azoic, stilbene, carotenoid, diphenylmethane, triarylmethane, xanthene, quinoline, acridine, methine, thiazole, indamine, indophenol, azine, oxazine, thiazine, sulfur, lactone, aminoketone, hydroxyketone, anthraquinone, indigloid, phthalocyanine and inorganic pigments. Colorants may be organic or inorganic, being dyes and or pigments. Dyes are colorants that do not normally scatter light but absorb light at some visible wavelength. Dyes are often soluble, at some concentration, in the polymer matrix of a colored article. Pigments are organic or inorganic colorants that are usually present in a matrix as discrete particles, insoluble in the matrix. The designation of a given colorant as pigment or dye is somewhat arbitrary since it will depend on the polymer matrix, colorant concentration, temperature, crystallinity and other factors.

Despite this huge variety of colorants there exists a problem in finding suitable colorants for thermoplastic polyester- polycarbonate blends, especially blends that will be exposed to direct sunlight and outdoor weathering. The colorant must be stable to polymer processing at high temperature, must not chemically degrade the resin matrix, must provide molded articles that have good initial color tone and high gloss and then, most difficult to achieve, retain the color, gloss and properties under weathering. We have found that surprisingly few specific colorants, that we believe must largely be soluble or very finely dispersed in a specific polyester blend matrix, give shaped articles with good as molded color and gloss and retain a significant portion or those properties when weathered under natural or artificial conditions.

It is desirable to select a colorant that exhibits good color and gloss retention when subjected to weathering test. Color shift and gloss should be desirably measured by a standard test so that comparison data may be generated to select a desirable dye colorant. Color shift measurements may be measured using the CieLAB system using L, a, b values to calculate a color shift: delta E, compared to an unweathered control. Surface gloss, often measured as 60° gloss values using ASTM D523, can also be monitored as a function of exposure time under normal weathering or in an accelerated weathering apparatus ("weatherometer") to determine resistance of a material to loss of properties due to photo-aging. The weatherometer as referred to in this application was run according to conditions given in the SAE J1960 or ASTM G26 protocols. Details of the weathering tests are discussed in the examples of the invention.

Examples of the invention will have high gloss as molded, that is with a 60° gloss of $\geq 80\%$, most preferred with a gloss of $\geq 90\%$, and will show greater than or equal to 50% retention of said initial gloss after 1000 hours of accelerated weathering under ASTM G26 or SAE J1060 test conditions.

The preferred compositions of the invention will show ≧50% retention of initial gloss after 3000 hours ASTM G26 or SAE J1960 accelerated weathering. The most preferred compositions of the invention will show 50% or greater retention of the initial gloss after 5000 hours of ASTM G26 or SAE J1960 accelerated weathering.

In addition to selecting a colorant that exhibits good color retention when subjected to weathering, it is desirable to independently check the colorant for gloss retention by performing separate weathering test at different concentrations of colorant to find the concentration with the desired optimized gloss retention.

Even further enhanced gloss retention may be desirably achieved with additions of a suitable gloss retention agent such as an UV absorber, for example, benzotriazoles. UV absorbers may be used in any effective concentration with ranges of 0.1–2.0 wt.% (based on the whole composition) being most preferred.

Preferred colorants of the invention having good thermal stability on processing and good retention of gloss during weathering of the compositions of the invention are: solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 50, pigment blue 29, amino ketone black (KEYSTONE BLACK AN from Keystone Aniline Co.), disperse blue 73, solvent blue 97, solvent blue 101, solvent blue 104, solvent blue 138, pigment yellow 139, disperse yellow 160, solvent yellow 84, solvent yellow 93, solvent yellow 98, solvent yellow 163 and solvent yellow 160:1.

The most preferred colorants having good thermal stability during processing and having both good color and gloss retention during the weathering of the compositions of the invention are: solvent red 135, solvent red 179, amino ketone black, solvent violet 14, solvent violet 36, solvent violet 50, disperse blue 73, solvent yellow 93, and disperse yellow 160.

In addition to the dye, and the optional gloss retention agent, the molding composition will contain a polyester and polycarbonate, polyarylate or polyester carbonate resin. Suitable polyester resins comprise from 10 to 90 weight percent of the composition of the invention. Polyester components include crystalline polyesters such as polyesters derived from an aliphatic or cycloaliphatic diol, or mixtures thereof, containing from 2 to about 12 carbon atoms and at least one aromatic or aliphatic dicarboxylic acid. Preferred polyesters are crystalline thermoplastics derived from an aliphatic diol and an aromatic dicarboxylic acid having repeating units of the following general formula:

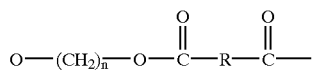

wherein n is an integer of from 2 to 6, and R is a $C_6$–$C_{20}$ radical comprising a decarboxylated residue derived from a dicarboxylic acid.

Examples of aromatic dicarboxylic acids represented by the dicarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4- 1,5- or 2,6-naphthalenedicarboxylic acids. Aliphatic dicarboxylic acids, especially cyclic dicarboxylic acids or derivatives may be used. The preferred dicarboxylic acids are terephthalic acid, isophthalic acid, cyclohexane dicarboxylic or mixtures thereof.

The most preferred polyesters are poly(ethylene terephthalate) "PET", and poly(butylene terephthalate), "PBT" and (polypropylene terephthalate) Also contemplated herein are the above polyesters with minor amounts, e.g., from about 0.5 to about 25 percent by weight, of units derived from aliphatic acids, diamines and/or aliphatic polyols to form copolyesters. The aliphatic polyols include glycols, such as poly(ethylene glycol) and poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mole %, preferably at least 80 mole %, of which consists of tetramethylene glycol and an acid component at least 70 mole %, preferably at least 80 mole %, of which consists of terephthalic acid, and polyester-forming derivatives therefore.

The polyesters used herein have an intrinsic viscosity of from about 0.4 to about 2.0 dl/g. as measured in a 60:40 phenol/tetrachloroethane mixture or similar solvent at 23–30° C. VALOX Registered TM 315 polyester is particularly suitable for this invention. Preferred PBT resins have an intrinsic viscosity of 1.1 to 1.4 dl/g.

Typically polycarbonates are prepared by reacting a dihydric phenol with a carbonate precursor, such as phosgene, a haloformate or a carbonate ester. Generally speaking, such carbonate polymers may be typified as possessing recurring structural units of the formula

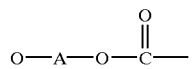

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2 hydroxyphenyl) methane; bis(4-hydroxyphenyl) methane; bis(4-hydroxy-5-nitrophenyl) methane; 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl)sulfone; bis(3,5-diethyl-4-hydroxyphenyl) sulfone; 2,2-bis(3,5-dimethyl4-hydroxyphenyl)propane; 2,4'-dihydroxydiphenyl sulfone; 5'-chloro-2,4'-dihydroxydiphenyl sulfone; bis-(4hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonate resins are disclosed in U.S. Pat Nos. 2,999,835; 3,028,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

These polycarbonates may be branched or linear and generally will have a weight average molecular weight of from about 10,000 to about 200,000, preferably from about 20,000 to about 100,000 as measured by gel permeation chromatography. The polycarbonates of the invention can employ a variety of end groups to improve performance. Bulky mono phenols, such as cumyl phenol, are preferred.

Preferred resins for enhanced weatherability and UV resistance are esters of aromatic dicarboxylic acids and bisphenols known as polyarylates. Polyarylate copolymers, with carbonate linkages in addition to the aryl ester linkages, known as polyester-carbonates, are also preferred. These resins may be used alone or in combination with each other or more preferably in combination with bisphenol polycarbonates. These resins can be prepared in solution or by melt polymerization from aromatic dicarboxylic acids or their ester forming derivatives and bisphenols and their derivatives. Suitable dicarboxylic acids are iso and terephthalic acid, their esters or acid chlorides. A preferred bisphenol is bisphenol A or its diacetate derivative. Polyester carbonates and polyarylates may also contain linkages derived from hydroxy carboxylic acids such as hydroxy benzoic acid. The most preferred polyester carbonate and polyarylates are derived from bisphenol A and mixture of iso- and terephthalic acid and are amorphous resins. U.S. Pat. No. 4,663,421 describes suitable polyarylates and U.S. Pat. Nos. 3,169,121; 4,156,069 and 4,269,731 describe suitable polyester-carbonates. All 4 patents are hereby incorporated by reference. In a preferred embodiment, the polyester-carbonate to polycarbonate ratio or polyarylate to polycarbonate ratio is 90:10 to 10:90% by weight.

Additional resin components may include, an effective amount of any of the known impact modifiers useful for polyesters and polyester blends. These may be added to the compositions by themselves or in combination with the aforementioned aromatic polycarbonates or polyesters. Useful impact modifiers generally comprise an acrylic or methacrylic grafted polymer of a conjugated diene or an acrylate elastomer, alone or co-polymerized with a vinyl aromatic compound. Other grafted polymers are the core-shell polymers of the type available from Rohm & Haas, for example ACRYLOID EXL2691 and ACRYLOID EXL3330. In general these impact modifiers contain units derived from butadiene in combination with a vinyl aromatic compound, acrylate, or akylacrylate ester such as methacrylate. The aforementioned impact modifiers are believed to be disclosed in Fromuth, et al., U.S. Pat. No. 4,180,494; Owens, U.S. Pat. No. 3,808,180; Farnham, et al., U.S. Pat. No. 4,096,202; and Cohen, et al., U.S. Pat. No. 4,260,693, all incorporated herein by reference. The impact modifier may comprise a two stage polymer having either a butadiene or n-butyl acrylate based rubbery core and a second stage polymerized from methylmethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a partially cross-linked butadiene polymer grafted base having grafted thereon acrylonitrile and styrene copolymers.

The most preferred impact modifiers are polyolefin copolymers with vinyl epoxide derived units. Such epoxide functional copolymers may be prepared from an olefin, such as ethylene and glycidyl acrylate or methacrylate. Other non functionalized vinyl containing monomers may also be incorporated such as alkyl acrylate or methacrylate, vinyl esters and vinyl ethers. Suitable epoxy containing polyolefin copolymers and terpolymers are described in U.S. Pat. No. 5,907,026 (herein incorporated by reference). The most preferred impact modifiers are ethylene-alkyl methacrylate-glycidyl methacrylate (EMA-GMA) terpolymers. Such epoxy olefin impact modifiers are preferred to be used at 1 to 5% loading.

As previously mentioned the UV resistance and weathering performance of the blends of the invention can be enhanced by addition of ultraviolet radiation absorbers. Benzotriazole UV absorbers are preferred for instance commercially available TINUVIN 234, MIXXIM BB/200 and CYASORB 5411. Other suitable UV absorbers are described in U.S. Pat. No. 5,907,026 hereby incorporated by reference. UV absorbers are used at any effective concentration generally from 0.1–2.0 wt. % of the entire mixture.

When combining polycarbonate, polyarylates or polyester-carbonates with polyester resins it is very desirable to use special stabilizers, often referred to as quenchers, to suppress polycarbonate polyester reaction. These stabilizers are used at a level of 0.01–10 weight percent and preferably at a level of from 0.05–2.0 weight percent. The stabilizers include an effective amount of an acidic phosphate salt; an acid, alkyl, aryl or mixed phosphite having at least one hydrogen or alkyl group; a suitable metal phosphate salt, preferably a Li, Na, K, Mg, Ca or Zn salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester component and the polycarbonate with and without the particular compound and determining the effect on melt viscosity or color stability or the formation of interpolymers. These stabilizers are further described in U.S. Pat. No. 5,441,997 in column 6, line 48 to column 7, line 10. This text is incorporated by reference into the present application.

In order to achieve the full benefits of this invention the type and amount of quencher should be chosen so that the colored resin composition is substantially free of particulates. Organic substituted quenchers like; partially esterified phosphorous acid, an acid, alkyl, aryl or mixed phosphite having at least one hydrogen or alkyl group, phosphoric or phosphorous acids are preferred. Mineral quenchers that will act as a particulate filler in the blend are less preferred but may be acceptable at a low level. Similarly any significant level of a particulate additive such as carbon black or titanium dioxide may be detrimental to gloss retention depending on the severity of the weathering conditions and the nature of the polyester blend matrix. The appropriate level of particles allowed into the blend will depend on the matrix and the length of weathering and can be determined using the process of our invention. Polyester blends of the invention with UV stabilizer and further containing at least some level (>5% preferred, >10% more preferred) of polyester-carbonate or polyarylate resins will have the best gloss retaining capability under severe weathering conditions. Such polyester polyarylate or polyester-carbonate blends will better tolerate the presence of low levels of particulates than blends of polyester with just aromatic polycarbonate (for examples Bis Phenol A-PC). In any event the gloss retention of all compositions of the invention will benefit from the absence of particulates.

The blends of the invention comprise less than 5 percent by weight additional ingredients which may be added to contribute to additional desirable properties such as: good mechanical properties, oxidation resistance, good processability, i.e. short molding cycle times, good flow, and easy release from the molding tool. Preferred are antioxidants such as hindered phenols, thioesters, phosphonites and phosphites. Mold release agents, especially low molecular weight polyesters such as pentaerythritol tetrastearate (PETS), are also preferred.

The colorants are incorporated into the resin composition by uniformly mixing into the desired resin composition. It is important that colorants be stable at processing temperatures. In a preferred embodiment, the colorant is stable at >200° C. (392° F.). Stability is desired at temperatures on the order of about 500° F. (260° C.), preferably at 550° F. (288° C.), and even more preferably 575° F. (302° C.). Unstable colorants should be avoided. As set forth previously in detail, stable colorants include solvent red 179, solvent red 135, solvent yellow 84, and solvent violet 13. Non preferred colorants will be strongly basic or acidic. Colorants with primary amino, sulfonic acid, or lithium, sodium or potassium carboxylate units should be avoided due to potential unfavorable interactions with the polycarbonate, polyester resins or the quenchers used to suppress the polycarbonate-polyester reaction.

Colorants of the invention should be chosen of such structure and at such concentrations that they remain essentially soluble in the matrix resins for the best retention of gloss during weathering. As discussed previously, while low levels of particulates may be present in the blend best performance is achieved in blends essentially free of organic and especially inorganic particulates.

The method of blending the compositions can be carried out by conventional techniques. One convenient method comprises blending the polyester, polycarbonate, colorants and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. Colorants or other portions of the blend may be added to the extruder downstream of the throat feed port.

Although it is not essential, best results are obtained if the ingredients are pre compounded, pelletized and then molded. Pre compounding can be carried out in conventional equipment. For example, after predrying the polyester and polycarbonate resins, the resins may be blended with other ingredients and. melt mixed on a single or twin screw extruder. The ingredients can be added all together or fed in portions into different areas of the melt mixing device. It may be advantageous to pre compound some ingredients of the blend before mixing with the remainder of the blend for example as described in U.S. Pat. No. 5,814,712 hereby incorporated by reference.

In the most preferred case using BPA polycarbonate, a polyester-carbonate and PBT or PET, a generally suitable machine temperature will be from about 240° C. to about 300° C. The pre-compounded composition can be extruded and cut or chopped into molding compounds, such as conventional granules, pellets, etc. by standard techniques. The compositions can be molded in any equipment conventionally used for thermoplastic compositions. For example, good results will be obtained in an injection molding machine, with conventional cylinder temperatures, e.g., 250° C. to 275° C., and conventional mold temperatures, e.g., 650 to 90° C.

The following examples are designed to illustrate the scope of the invention and should not be construed to limit the claims in any manner whatsoever.

EXAMPLES

Blends of the invention were prepared by combining all ingredients and mixing together with no heat for 1–5 minutes on a paint shaker. The mixture was then extruded at 250–280° C. at 200–300 rpm in a 30 mm co-rotating twin screw extruder, the resultant strands were cooled, pelletized and dried for 2–3 h at 125° C. The dry pellets were then injection molded into ⅛ inch thick parts and tested using standard ASTM test conditions.

Weathering was performed on injection molded 2.5× 2.5×⅛ in. chips under the following conditions.

ASTM G26 weathering used a xenon arc bulb in an Atlas weather-o-meter with borosilicate filters. Light was on continuously with a water spray on the weathered face of the sample every 2 h. Temperature was about 63° C. Samples received 30 KJ of energy per day. Irradiance was 0.35 watts/m$^2$ at 340 nm.

SAE J1960 weathering used a xenon arc bulb with a quartz/borosilicate filter in an Atlas weather-o-meter. During a 24 h period light was on for a total of 16 h at 1.98 KJ/h. Samples were in the dark for 8 one hour periods during the 24 h cycle. The samples were periodically sprayed with water on both sides. Irradiance during the light cycle was 0.55 watts/m$^2$ at 340 nm. Sample temperature during the light cycle was 70° C. Total energy delivered in a day was 31.68 KJ.

While the two test methods differ in the details of sample exposure both delivered very similar amounts of light energy to the sample and are generally accepted in the industry as mimics of exposure to natural weathering conditions. Samples were tested as removed from the weatherometer with no polishing or cleaning.

Examples 1–6

(Table 1)

The following examples 1–6 show a PBT/BPA-PC blend impact modified with an EMA-GMA terpolymer further containing hindered phenol stabilizer, phosphite stabilizer, a benzotriazole UV stabilizer and a dye package giving a black color. Mixtures of different molecular weight BPA polycarbonates, BPA-PC 100 and BPA-PC 121(LEXAN 100 and 120 from GE Plastics) are used in all examples. Blends 2, 3 & 4 further contain from 14 to 18.7% of a polyester-carbonate. Blends 5 & 6 have 11.2–14% of a polyarylate resin. All the examples show improved gloss retention. Note that by use of a polyarylate or polyester-carbonate, even at only 11.2 to 18.7%, gives high gloss values after 10000 hours ASTM G26 weathering.

TABLE 1

Examples 1–6

| | Examples | | | | | |
|---|---|---|---|---|---|---|
| | 1 | 2 | 3 | 4 | 5 | 6 |
| PBT 315 | 30.0 | 30.0 | 30.0 | 30.0 | 30.0 | 30.0 |
| PC:EMAGMA (80:20) | 10.0 | 10.0 | 10.0 | 10.0 | 10.0 | 10.0 |
| Tinuvin-234 | 0.6 | 0.6 | 0.6 | 0.6 | 0.6 | 0.6 |
| Irgaphos-168 | 0.2 | 0.2 | 0.2 | 0.2 | 0.2 | 0.2 |
| Irganox-1076 | 0.2 | 0.2 | 0.2 | 0.2 | 0.2 | 0.2 |
| $H_3PO_3$ 45% aq. | 0.1 | 0.1 | 0.1 | 0.1 | 0.1 | 0.1 |
| Black Dyes | 0.5 | 0.5 | 0.5 | 0.5 | 0.5 | 0.5 |
| BPA-PC 121 | 14.0 | 14.0 | 14.0 | 14.0 | 14.0 | 14.0 |
| BPA-PC 100 | 44.5 | 30.5 | 30.5 | 25.8 | 30.5 | 33.3 |
| Polyarylate U-100 | | | | | 14.0 | 11.2 |
| PPC-4701R | | 14.0 | | | | |
| PCE | | | 14.0 | 18.7 | | |
| 60 Gloss | | | | | | |
| 0 hours | 95 | 98 | 100 | 100 | 100 | 100 |
| 1440 hours | 72 | 83 | 68 | 85 | 87 | 83 |
| 3600 hours | 13 | 80 | 61 | 78 | 84 | 73 |
| 5760 hours | 4 | 71 | 73 | 71 | 74 | 68 |
| 7200 hours | not run | 83 | 74 | 70 | 77 | 72 |
| 10000 hours | not run | 79 | 73 | 78 | 75 | 71 |
| N. Izod ft-lbs/in. | 14.8 | 14.3 | 14.8 | 14.9 | 12.8 | 12.4 |
| % Elong. @ break | 115 | 90 | 110 | 100 | 70 | 100 |
| Tens. Str. (yield) Kpsi | 9.1 | 9.4 | 9.4 | 9.3 | 9.1 | 9.2 |
| Flex. Str. Kpsi | 13.5 | 13.5 | 13.6 | 13.6 | 13.3 | 13.6 |
| Flex. Mod. Kpsi | 348 | 343 | 342 | 344 | 348 | 348 |

Black Dyes: 0.18% KEYPLAST black AN; 0.06% solvent blue 97; 0.10% solvent green 3, 0.12% solvent red 179
Polyarylate = Unitika U-100 resin = poly BPA iso/ tere phthalate
BPA-PC = LEXAN 100 and 120 from GE Plastics
PCE = Polyester-carbonate 60% ester, 1:1 iso:tere phthalate units
PPC = Polyester-carbonate 80% ester, 93:7 iso:tere phthalate units
LEXAN 4701R from GE Plastics
PBT = VALOX 315 from GE Plastics

Examples 7–11

(Table 2)

Examples 7–11 show the use of different colorants: Solvent Yellow 93, Solvent Violet 36, Solvent Red 135, Solvent Green 3 and Solvent Red 179 in blends of PBT, BPA-PC, a polyester-carbonate copolymer (LEXAN 4701R from GE Plastics) and an ethylene methylacrylate, gylcidyl methacrylate (EMA-GMA) copolymer. The EMA-GMA copolymer was obtained from Elf Ato Chem as LOTADER AX8900. As can been seen in Table 2, samples 7–11 show greater than 54% retention of initial gloss after 3788 h (5000 KJ) weathering under SAE J 1960 conditions.

TABLE 2

Examples 7–11 Colorant Effects

| | Examples | | | | |
|---|---|---|---|---|---|
| | 7 | 8 | 9 | 10 | 11 |
| Polycarbonate | 53.15 | 53.15 | 53.15 | 53.15 | 53.15 |
| PBT | 30.00 | 30.00 | 30.00 | 30.00 | 30.00 |
| Polyester-carbonate | 14.00 | 14.00 | 14.00 | 14.00 | 14.00 |
| EMA-GMA | 2.00 | 2.00 | 2.00 | 2.00 | 2.00 |
| 45% Phosphorous Acid | 0.05 | 0.05 | 0.05 | 0.05 | 0.05 |
| IRGAPHOS 168 | 0.20 | 0.20 | 0.20 | 0.20 | 0.20 |
| TINUVIN 234 | 0.30 | 0.30 | 0.30 | 0.30 | 0.30 |
| SOL-YEL-93 | 0.30 | | | | |
| SOL-VLT-36 | | 0.30 | | | |
| SOL-RED-135 | | | 0.30 | | |
| SOL-GRN-3 | | | | 0.30 | |
| SOL-RED-179 | | | | | 0.30 |
| J1960 (KJ) | Gloss 60 Readings | | | | |
| 0 KJ = 0 h | 100 | 100 | 99 | 99 | 99 |
| 625 KJ = 473 h | 99 | 99 | 99 | 98 | 98 |
| 1250 KJ = 947 h | 93 | 97 | 97 | 97 | 94 |
| 1875 KJ = 1420 h | 90 | 94 | 91 | 90 | 87 |
| 2500 KJ = 1894 h | 89 | 90 | 93 | 90 | 89 |
| 3750 KJ = 2841 h | 79 | 90 | 82 | 88 | 86 |
| 5000 KJ = 3788 h | 76 | 61 | 85 | 54 | 77 |

Examples 12–15

(Table 3)

Examples 12–15 show examples of the invention using mixtures of colorants. Examples 12,13 and 14 include low levels of a particulate colorant: $TiO_2$. While use of $TiO_2$ is not preferred, in a highly weatherable matrix like those containing polyester-carbonate (LEXAN 4701R) good gloss retention can be obtained.

However results can be surprising. Example 15, with no $TiO_2$, might be predicted to give better gloss retention than examples 12, 13 and 14, but as can be seen while gloss of >50% is retained after 1000 h ASTM G26 weathering the lighter colors have slightly higher gloss. Note that all of these blends have slightly higher EMAGMA levels than the previous examples.

TABLE 3

Examples 12–15

| | Examples | | | |
|---|---|---|---|---|
| | 12 | 13 | 14 | 15 |
| Polycarbonate | 51.46 | 51.60 | 51.01 | 51.41 |
| PBT | 30.0 | 30.0 | 30.0 | 30.0 |
| Polyester carbonate | 14.0 | 14.0 | 14.0 | 14.0 |
| EMA-GMA | 3.0 | 3.0 | 3.0 | 3.0 |
| 45% Phosphorous Acid | 0.05 | 0.05 | 0.05 | 0.05 |
| IRGAFOS 168 | 0.20 | 0.20 | 0.20 | 0.20 |
| TINUVIN 234 | 0.30 | 0.30 | 0.30 | 0.30 |
| TiO2 | 0.2000 | 0.3000 | 0.4900 | |
| Carbon Black | 0.0005 | | 0.5300 | |
| SOL-RED-135 | 0.4300 | | 0.0003 | 0.2500 |
| SOL-YEL-93 | 0.3600 | | | 0.1980 |
| PIG-GRN-50 | | | | |
| PIG-RED-101 | | 0.0010 | | |
| PIG-YEL-138 | | 0.1100 | | |
| SOL-ORG-60 | | | 0.0900 | |
| PIG-YEL-183 | | 0.4400 | | |
| SOL-VLT-13 | | | | 0.2650 |
| SOL-GRN 3 | | 0.3300 | | 0.3300 |
| ASTM G26 (hours) | 60 degree Gloss | | | |
| 0 hours | 101 | 97 | 102 | 101 |
| 300 hours | 98 | 95 | 95 | 99 |
| 600 hours | 79 | 88 | 71 | 83 |
| 1000 hours | 62 | 62 | 55 | 53 |
| 1500 hours | 26 | 40 | 34 | 33 |

Examples 16–21

(Table 4)

Blends with and without polyester-carbonate are compared in examples 16–21 with different colorant combinations of $TiO_2$, Solvent Orange 60 and Solvent Red 135 combined to give each set of blends about the same original appearance. Note the consistently higher gloss levels achieved after J1960 weathering in polyester-carbonate blends of examples 17,19 and 21.

TABLE 4

Examples 16–21

| | Examples | | | | | |
|---|---|---|---|---|---|---|
| | 16 | 17 | 18 | 19 | 20 | 21 |
| Polycarbonate | 58.16 | 44.45 | 59.03 | 44.64 | 59.23 | 45.01 |
| PBT | 30.0 | 30.0 | 30.0 | 30.0 | 30.0 | 30.0 |
| Polyester carbonate | | 14.0 | | 14.0 | | 14.0 |
| PC: EMA-GMA 80:20 | 10.0 | 10.0 | 10.0 | 10.0 | 10.0 | 10.0 |
| 45% aq. H3PO3 | 0.05 | 0.05 | 0.05 | 0.05 | 0.05 | 0.05 |
| IRGAPHOS 168 | 0.20 | 0.20 | 0.20 | 0.20 | 0.20 | 0.20 |
| TINUVIN 234 | 0.30 | 0.30 | 0.30 | 0.30 | 0.30 | 0.30 |
| TiO2 | 0.500 | 0.500 | 0.100 | 0.350 | 0 | 0.200 |
| SOL-ORG-60 | 0.680 | 0.400 | 0.270 | 0.360 | 0.185 | 0.195 |
| SOL-RED-135 | 0.110 | 0.100 | 0.051 | 0.100 | 0.038 | 0.049 |
| J1960 | Gloss 60 | | | | | |
| 0 hours | 100 | 103 | 101 | 103 | 101 | 101 |
| 473 hours | 95 | 100 | 95 | 102 | 96 | 99 |
| 947 hours | 51 | 88 | 59 | 92 | 59 | 94 |
| 1420 hours | 27 | 85 | 31 | 93 | 32 | 84 |
| 1894 hours | 14 | 63 | 16 | 78 | 15 | 70 |

Control Examples A–D

Table 5

Examples A–D are blends of PBT with BPA-PC containing 2% EMA-GMA with standard colorant packages using TiO$_2$ and carbon black. Even with 0.3% UV absorber (TINUVIN 234 from Ciba Geigy Company) these samples all show rapid loss of gloss under both ASTM G26 and SAE J1960 weathering conditions.

| | Control Examples | | | |
|---|---|---|---|---|
| | A | B | C | D |
| Polycarbonate | 58.6090 | 57.7000 | 56.4600 | 58.0940 |
| PBT | 30 | 30 | 30 | 30 |
| PC:EMAGMA 80:20 | 10 | 10 | | 10 |
| 45% Phosphorous Acid | 0.05 | 0.05 | 0.05 | 0.05 |
| IRGAPHOS 168 | 0.20 | 0.20 | 0.20 | 0.20 |
| TINUVIN 234 | 0.30 | 0.30 | 0.30 | 0.30 |
| TiO2 | 0.06 | 1.49 | | 0.36 |
| Carbon Black | 0.00019 | 0.004 | | 0.119 |
| Carbon Black:PC 20:80 | | | 2.9900 | |
| SOL-RED-135 | 0.0018 | | | |
| PIG-YEL-138 | | | | 0.1190 |
| PIG-YEL-183 | 0.7800 | | | |
| PIG-BLU-15:4 | | 0.0003 | | |
| PIG-GRN-7 | | | | 0.7590 |
| PIG-YEL-119 | | 0.2600 | | |
| J1960 (KJ) | Gloss 60 Readings | | | |
| 0 KJ = 0 h | 93 | 97 | 100 | 100 |
| 625 KJ = 473 h | 63 | 27 | 57 | 29 |
| 1250 KJ = 947 h | 29 | 6 | 4 | 3 |
| 1875 KJ = 1420 h | 10 | 3 | 3 | 2 |
| 2500 KJ = 1894 h | 5 | 2 | 1 | 1 |
| G26 (Hours) | | | | |
| 0 hours | 93 | 97 | 100 | 100 |
| 720 hours | 83 | 42 | 80 | 50 |
| 1440 hours | 13 | 3 | 8 | 3 |
| 2160 hours | 5 | 2 | 5 | 7 |

What is claimed is:

1. A process for preparing a high gloss retention resin molding composition, comprising:

blending a polyester resin; a resin polycarbonate; a resin selected from the group consisting of polyarylate, polyester-carbonate, and mixtures thereof, wherein the composition has a polyester-carbonate to polycarbonate weight ratio or a polyarylate to polycarbonate ratio of 90:10 to 10:90; and at least one synthetic colorant wherein the synthetic colorant is stable at molding temperatures and does not contain primary amino, sulfonic acid, or alkali metal carboxylate functionality, wherein the composition has an initial 60° gloss value measured according to ASTM D523 of greater than or equal to 80%; and wherein the composition has greater than or equal to 50% retention of initial gloss after 1000 hours weathering under ASTM G26 or SAE J1960 conditions.

2. The process according to claim 1 wherein the composition further comprises a gloss retention agent.

3. The composition of claim 1, further comprising an impact modifier.

4. The process according to claim 1 wherein the polycarbonate, polyarylate, and polyester-carbonate resins comprise units derived from the group consisting of bisphenol A, isophthalic acid, and terephthalic acid.

5. The process according to claim 1 wherein the polyester is selected from the group consisting of poly(ethylene terephthalate) "PET", poly(1,4-butylene terephthalate) "PBT", (polypropylene terephthalate) "PPT", and mixtures thereof.

6. The process according to claim 1 wherein the composition comprises a mixture of the aromatic polyester-carbonate, the polyarylate, and the polycarbonate resin.

7. The process according to claim 2 wherein the gloss retention agent comprises a benzotriazole UV stabilizer.

8. The process according to claim 1 wherein the composition is substantially free from inorganic particles.

9. The process according to claim 3 wherein the impact modifier is selected from the group consisting of: methacrylate butadiene rubber, acrylic rubber and polyolefin copolymers containing acrylic, methacrylic, vinyl ester or vinyl ether derived units.

10. The process of claim 9 wherein the impact modifier comprises a polyolefin copolymer containing epoxide functionality.

11. The process of claim 10 wherein the impact modifier comprises a polyolefin copolymer wherein the epoxide functionality is derived from a glycidyl ester.

12. The process according to claim 1 wherein the synthetic colorant is colorfast under sunlight and is stable at >200° C.

13. The process according to claim 1 wherein the synthetic colorant is selected from the group consisting of solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 13, solvent violet 14, solvent violet 36, solvent violet 50, pigment blue 29, amino ketone black, disperse blue 73, solvent blue 97, solvent blue 101, solvent blue 104, solvent blue 138, pigment yellow 139, disperse yellow 160, solvent yellow 84, solvent yellow 93, solvent yellow 98, solvent yellow 163, solvent yellow 160:1, and mixtures thereof.

14. The process of claim 13 wherein the synthetic colorant is selected from the group consisting of solvent red 135, solvent red 179, amino ketone black, solvent violet 14, solvent violet 36, solvent violet 50, disperse blue 73, solvent yellow 93, disperse yellow 160, and mixtures thereof.

15. The process of claim 1 wherein the composition has greater than or equal to 50% retention of initial gloss after 5000 hours weathering under ASTM G26 or SAE J1960 conditions wherein the initial gloss was greater than or equal to 80%.

16. The process of claim 1 wherein the composition has greater than or equal to 50% retention of initial gloss after 3000 hours weathering under ASTM G26 or SAE J1960 conditions wherein the initial gloss was greater than or equal to 80%.

17. A weatherable polyester composition made by process of claim 1.

18. A weatherable polyester composition made by the process of claim 1 with an initial gloss of ≧80% which retains ≧50% retention of initial gloss after 5000 hours of ASTM G26 or SAE J1960 conditions.

19. A weatherable polyester composition made by the process of claim 1 with an initial gloss of ≧80% which retains ≧50% retention of initial gloss after 3000 hours of ASTM G26 or SAE J1960 conditions.

20. A weatherable polyester composition made by the process of claim 1 with an initial gloss of ≧80% which retains ≧50% retention of initial gloss after 1000 hours of ASTM G26 or SAE J1960 conditions.

21. The process according to claim 1 wherein the synthetic colorant is stable to at least about 275° C.

22. The process according to claim 3 wherein the impact modifier comprises an ethylene-alkyl methacrylate-glycidyl methacrylate terpolymer.

23. The process according to claim 1 wherein the synthetic colorant is selected from the group consisting of solvent green 3, solvent green 28, solvent red 52, solvent red 111, solvent red 135, solvent red 169, solvent red 179, solvent red 207, disperse red 22, vat red 41, solvent orange 60, solvent orange 63, solvent violet 14, solvent violet 36, solvent violet 50, pigment blue 29, amino ketone black, disperse blue 73, solvent blue 97, solvent blue 101, solvent blue 104, solvent blue 138, pigment yellow 139, disperse yellow 160, solvent yellow 84, solvent yellow 93, solvent yellow 98, solvent yellow 163, solvent yellow 160:1, and mixtures thereof.

24. The process according to claim 1 wherein the synthetic colorant is selected from the group consisting of solvent green 3, solvent red 135, solvent red 179, pigment red 101, solvent orange 60, solvent violet 13, solvent violet 36, solvent blue 97, solvent yellow 93, and mixtures thereof.

25. The process according to claim 1 wherein the composition further comprises titanium dioxide, carbon black, or a mixture thereof.

26. A process for preparing a high gloss retention resin molding composition comprising:

blending a polyester resin, a polycarbonate resin, a polyarylate resin, and at least one synthetic colorant, wherein the resin blend comprises from 10 to 90 weight percent of polyester resin and from 10 to 90 weight percent of polycarbonate resin or polyarylate resin or their mixture thereof, and wherein the synthetic colorant is stable at molding temperatures and does not contain primary amino, sulfonic acid, or alkali metal carboxylate functionality; wherein the composition has an initial 60° gloss value measured according to ASTM D523 of greater than or equal to 80%; and wherein the composition has greater than or equal to 50% retention of initial gloss after 1000 hours weathering under ASTM G26 or SAE J1960 conditions.

27. A weatherable polyester composition made by the process of claim 25.

* * * * *